United States Patent [19]
Shur

[11] Patent Number: 5,570,346
[45] Date of Patent: Oct. 29, 1996

[54] PACKET NETWORK TRANSIT DELAY MEASUREMENT SYSTEM

[75] Inventor: David H. Shur, Middletown, N.J.

[73] Assignee: Lucent Technologies Inc., Murray Hill, N.J.

[21] Appl. No.: 351,998

[22] Filed: Dec. 8, 1994

[51] Int. Cl.$^6$ ........................................................ H04J 3/14
[52] U.S. Cl. ................................. 370/17; 370/60; 370/94.1
[58] Field of Search .................................. 370/13, 14, 17, 370/53, 54, 58.1, 58.2, 60, 61, 94.1; 340/825.15, 825.89, 825.92; 364/551.01, 554

[56] References Cited

U.S. PATENT DOCUMENTS

| | | | |
|---|---|---|---|
| 5,274,625 | 12/1993 | Derby et al. | 370/17 |
| 5,371,733 | 12/1994 | Denneau | 370/17 |
| 5,381,404 | 1/1995 | Sugano et al. | 370/13 |

OTHER PUBLICATIONS

K. Fendick et al., "Traffic Engineering Operations for the ACCUNET® Packet Service Network," IEEE Gobecom, Dec. 1988, pp. 11.2.1–11.2.5.

H. Kobayashi, "Modeling and Analysis: An Intro. to System Performance Evaluation Methodology," Addison–Wesley (1978), pp. 320–325.

*Primary Examiner*—Alpus H. Hsu
*Assistant Examiner*—Ricky Ngo

[57] ABSTRACT

A system for analyzing and estimating average transit delay and high percentiles of delay in a packet network. The system utilizes detailed packet switch measurements that are normally stored in a network database for maintenance and engineering purposes. The system randomly selects source and destination points and samples the stored maintenance measurements for network circuit elements located between the randomly selected source and destination points. These sampled measurements are transmitted to the system processor via electronic mail and the system generates a single server queuing model to determine average and variance of delay for each component. A network-of-queues model is then constructed to determine the end-to-end average delay and end-to-end variance of delay. An Erlang probability distribution is then fit to these end-to-end values to provide statistics of packet transit delay in the packet network.

19 Claims, 7 Drawing Sheets

PACKET NETWORK TRANSIT DELAY MEASUREMENT SYSTEM

BACKGROUND OF THE INVENTION

1. Field of the Invention

The present invention relates to dam communications networks, and more particularly to a system for measuring transit delay in a packet network.

2. Description of the Related Art

In many data communications networks, data is generated in high intensity bursts that are often separated by idle periods therebetween. The average data rate may, therefore, be much lower than the peak rate. An economic way of transmitting this type of intermittent (bursty) data is to assemble the data into what is known in the art as "packets" and interspersing packets from several different channels on a single, physical communication path. This communication path is therefore occupied by a particular packet only for the time corresponding to the packet length, and the communication path is then available for use by other packets that may be between different data terminals.

A packet refers to a group of bits that are switched in the network as an integral unit. A packet may also include a header that is used to identify that packet. A packet is formatted in a particular way and may contain data, and destination, origination and control information.

In a typical packet-switching network, a number of users can be interconnected. Packet switches are utilized in the network to sort packets received from one circuit and direct these packets to another circuit according to the header information for each packet. A typical packet switch is AT&T's 1 PSS™ packet switch which implements the CCITT X.25 packet-switching protocol.

In any data communications network, a primary concern in the performance of the network is the time in which information is processed and transmitted back to the user. This time is typically referred to as response time or network transit delay. Network transit delay in a packet-switching network may be a function of data transmission speed, propagation time, distance through the network, packet-switch processing time and queuing delay.

To evaluate the performance of a packet network, transit delay is generally measured from the time the last bit of a particular packet enters the provider's originating central office equipment (e.g., originating packet switch) to the time the first bit of the packet leaves the provider's destination central office equipment (e.g., destination packet switch).

In designing and maintaining data communications systems, it is essential to minimize network transit delays. In fact, most customers today have strict requirements regarding the permissible transit delay in the network. Customers will often require the provider of the data communications network to pay a penalty if the transit delay exceeds a predetermined level.

Therefore, it is important for the design and maintenance of a data communications system to effectively measure transit delay in the packet network. Moreover, customers of the system frequently require periodic measurements of transit delay to ascertain whether the system is performing within the limits of the customers' service contracts.

There are currently a number of measurement systems used today to estimate or measure network transit delay. These measurement systems generally fall into two categories and are illustrated in FIG. 1.

The first type of measurement system is a protocol analyzer 20 which includes hardware connected to the packet network 10 for analyzing and measuring transit delay. Transit delay is measured by connecting a protocol analyzer 20 to a desired measurement point in the network 10 and essentially time stamping a particular packet to determine the actual transit delay of that particular packet.

This type of measurement system, however, can be extremely expensive because it requires a protocol analyzer 20 at each desired measurement point. Thus, if a customer has numerous access points to the network 10, as they often do, protocol analyzers 20 would be required at each point of access into the network 10.

In addition to the expense associated with requiring a protocol analyzer 20 at each desired measurement point, each protocol analyzer 20 must be located in the service node (i.e., the packet switch) in the network 10, and also requires space for locating the protocol analyzer 20, power for operating the equipment, and the ability to access the equipment for installation and maintenance purposes.

The second type of system for measuring transit delay is through the use of measurement software 22 that may exist in the customer's end equipment and/or at various locations in the packet network 10. The measurement software 22, however, must be developed, tested and integrated into the network 10 and frequently requires updating (reintegration) each time the software in the packet network 10 is updated, changed or otherwise modified (software maintenance).

It is, therefore, desirable to provide a cost effective, non-invasive measurement system to estimate transit delay in a packet network 10 that does not require hardware or measuring software to be added to the network 10.

SUMMARY OF INVENTION

The present invention provides a cost effective system for estimating the end-to-end packet delay distributions in a packet network. The system analyzes and estimates average transit delay and high percentiles of delay in a packet network by utilizing detailed packet switch measurements that are normally collected and stored in a network database for maintenance and engineering purposes. The system randomly selects various source and destination points and samples the stored maintenance measurements for specific network circuit elements between the randomly selected source and destination points. These sampled measurements are transmitted to the system processor and a single server queuing model is generated to determine average and variance of delay for each identified element. A network-of-queues model is then constructed to determine the end-to-end average delay and end-to-end variance of delay. An Erlang probability distribution is then applied to these end-to-end packet delay statistics to provide end-to-end packet transit delay percentiles for the packet network.

DESCRIPTION OF THE PREFERRED EMBODIMENTS

Figure 1:
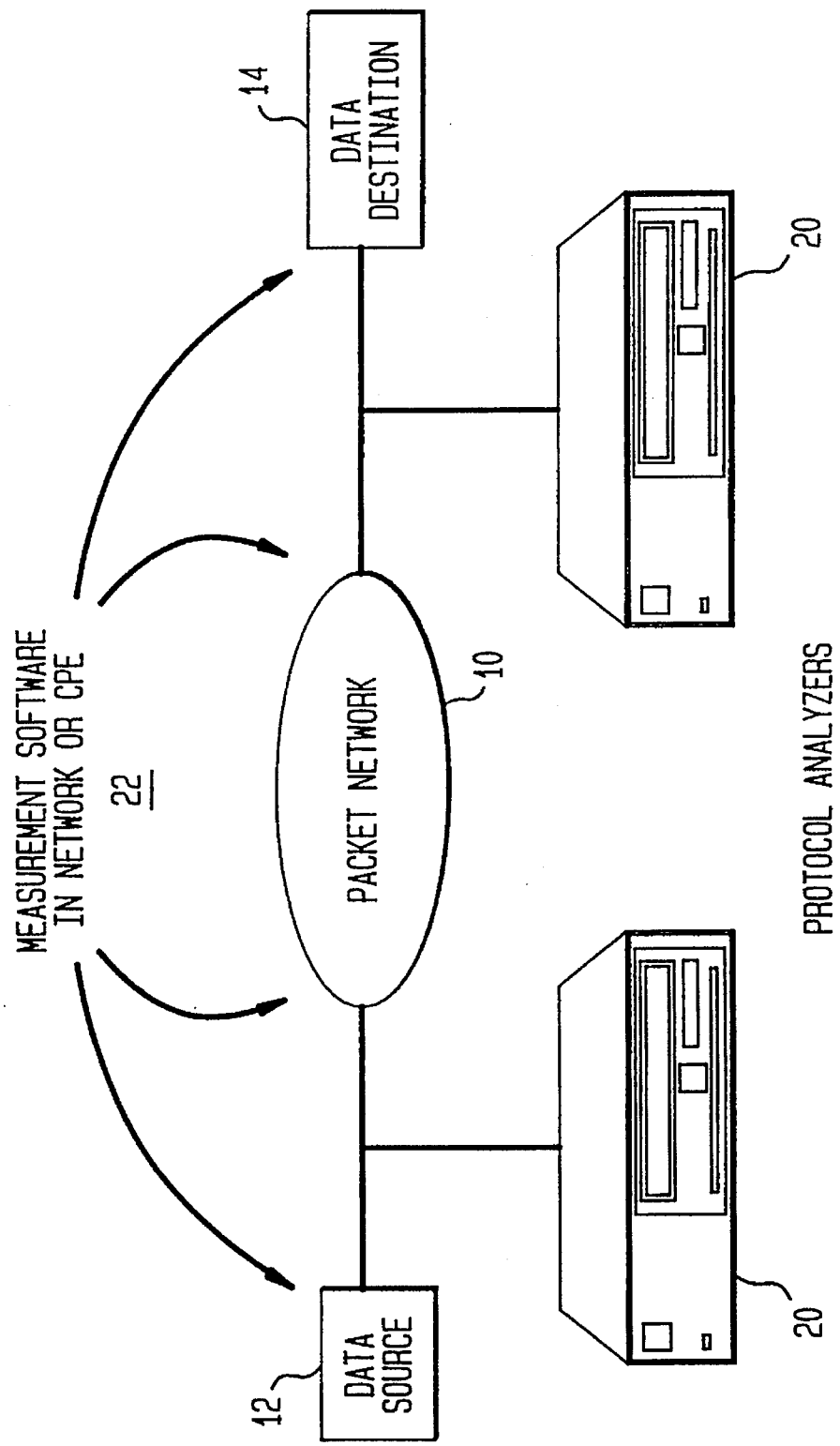
FIG. 1 is a network overview illustrating the prior art methods of measuring packet network transit delay.
Figure 2:
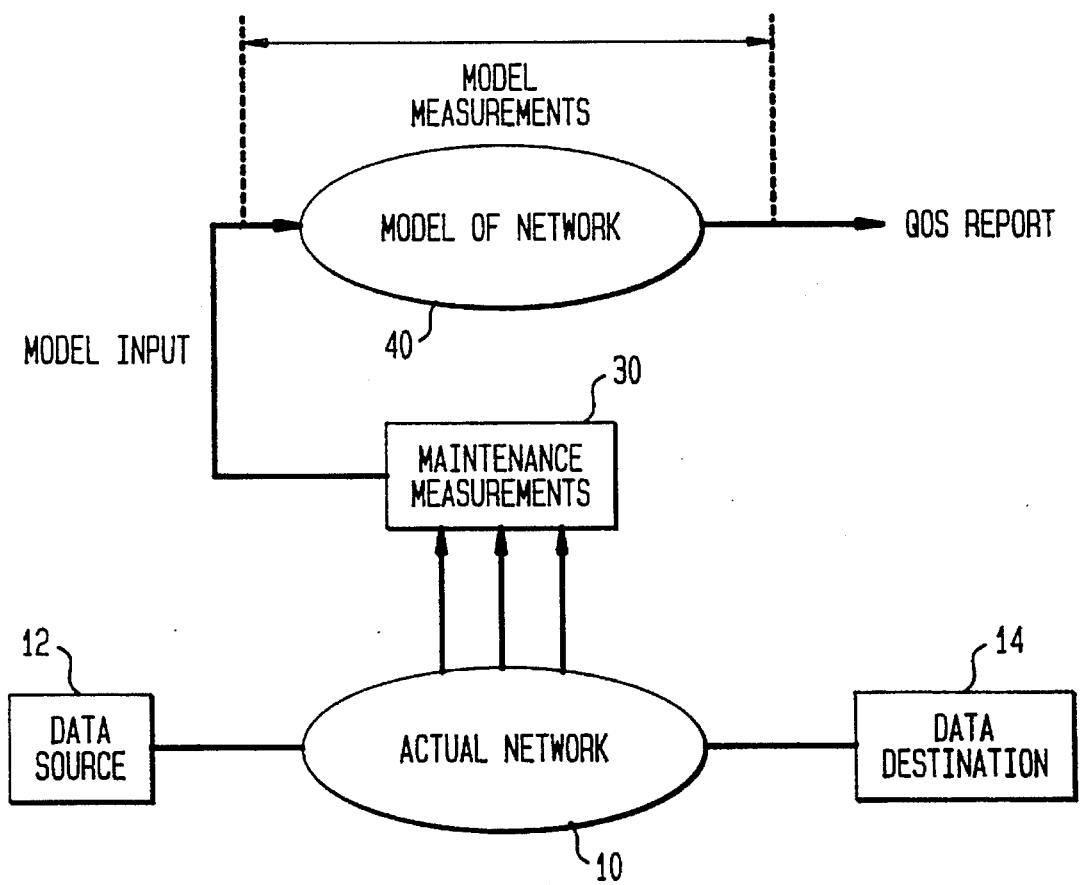
FIG. 2 is an illustration of the measurement modelling approach of the present invention.

The present invention provides a cost effective method for estimating the end-to-end delay distributions in a packet network. Referring to FIG. 2, a packet network 10 is generally shown connecting a data source 12 to a data destination 14. Although not illustrated, it is commonly known that a packet network 10 may consist of numerous elements or components, including, but not limited to, access lines, gateway links, inter-switch trunks, packet switches, packet assembler and disassemblers (PAD), concentrators, multiplexers and interfaces.

Figure 3:
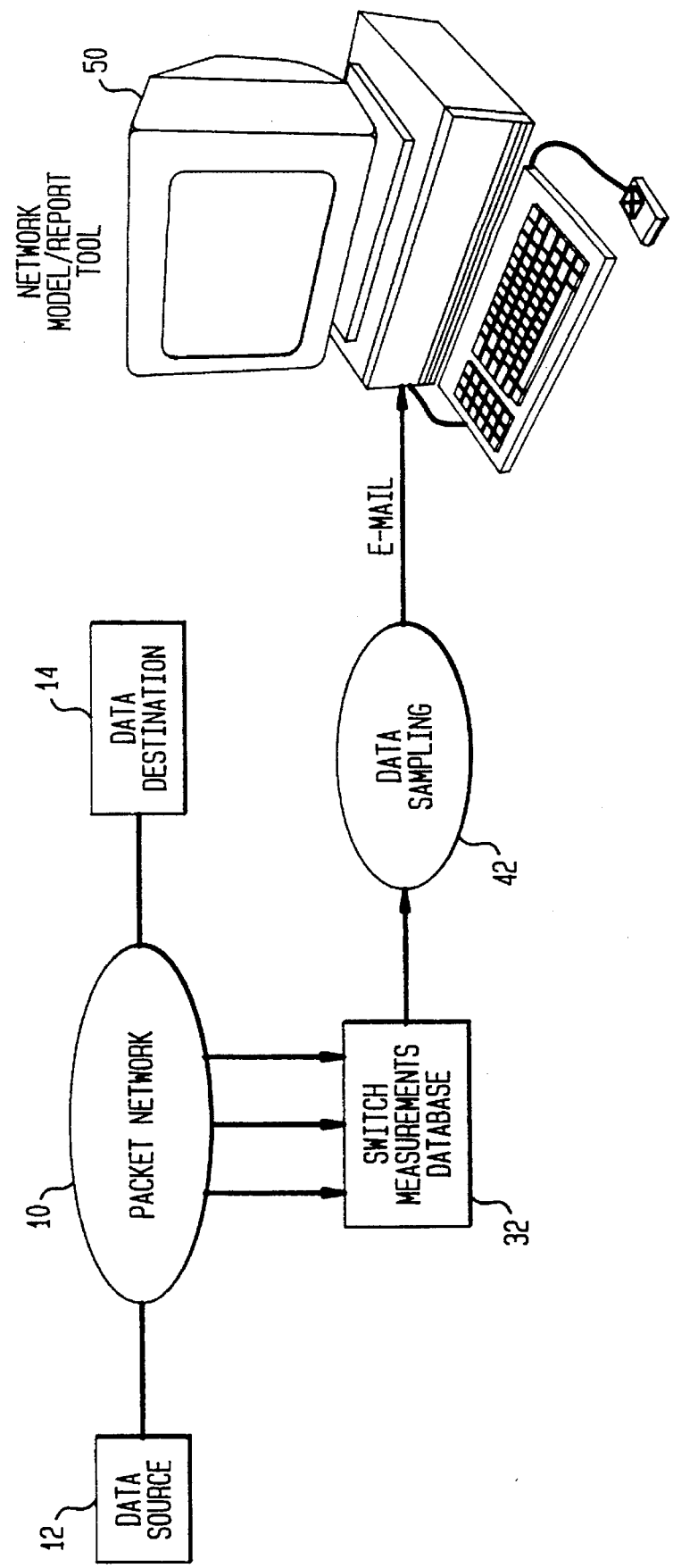
FIG. 3 is an illustration of a preferred embodiment of the present invention.

As part of the normal operation of a packet network 10, it is common for a provider of the network 10 to collect certain packet switch maintenance measurements or data 30 for engineering and maintenance purposes to keep the network 10 operational. The maintenance measurements 30 are typically stored in a database 32 of network 10 as illustrated in FIGS. 2 and 3. The maintenance measurements 30 also represent the amount of packets that are transmitted through the network 10.

For each circuit in the network 10, these maintenance measurements 30 commonly include packet counts, byte counts, speed of circuit, errored frame rate, average packet size, packet retransmission rate, packet switch utilization and circuit utilization. Although well known in the art, the above-mentioned maintenance measurements 30 will be generally described below.

A packet count generally refers to the number of packets switched by a particular element (i.e., a packet switch) in the network 10 in a given period of time. Byte count refers to the number of bytes contained in the information field of the packets that have been switched by the particular element in the network 10 in a specified interval of time.

Speed of circuit is a fixed parameter that generally refers to the capacity of the network circuit in bits per second. Errored frame rate refers to the number of frames (dam link layer) that were received in error in a given interval of time.

Average packet size generally refers to the average size of packets measured in bytes. Packet retransmission rate refers to the number of packets retransmitted (e.g., transmitted more than once) in the network 10 in a given period of time.

Packet switch utilization refers to the fraction of the capacity of the packet switch processor (not shown) that is utilized in a given interval of time. Packet switch utilization is based upon the previously described packet count.

Circuit utilization refers to the fraction of the capacity of the network circuit (not shown) that is utilized in a specified period of time. Circuit utilization is derived from the previously described byte count.

As is illustrated in FIGS. 2 and 3, the present invention utilizes the above-mentioned maintenance measurements 30 for specific network elements to generate a model 40 of the network 10. The network model 40 is utilized to estimate the end-to-end delay statistics and distribution in the network 10.

Figure 5:
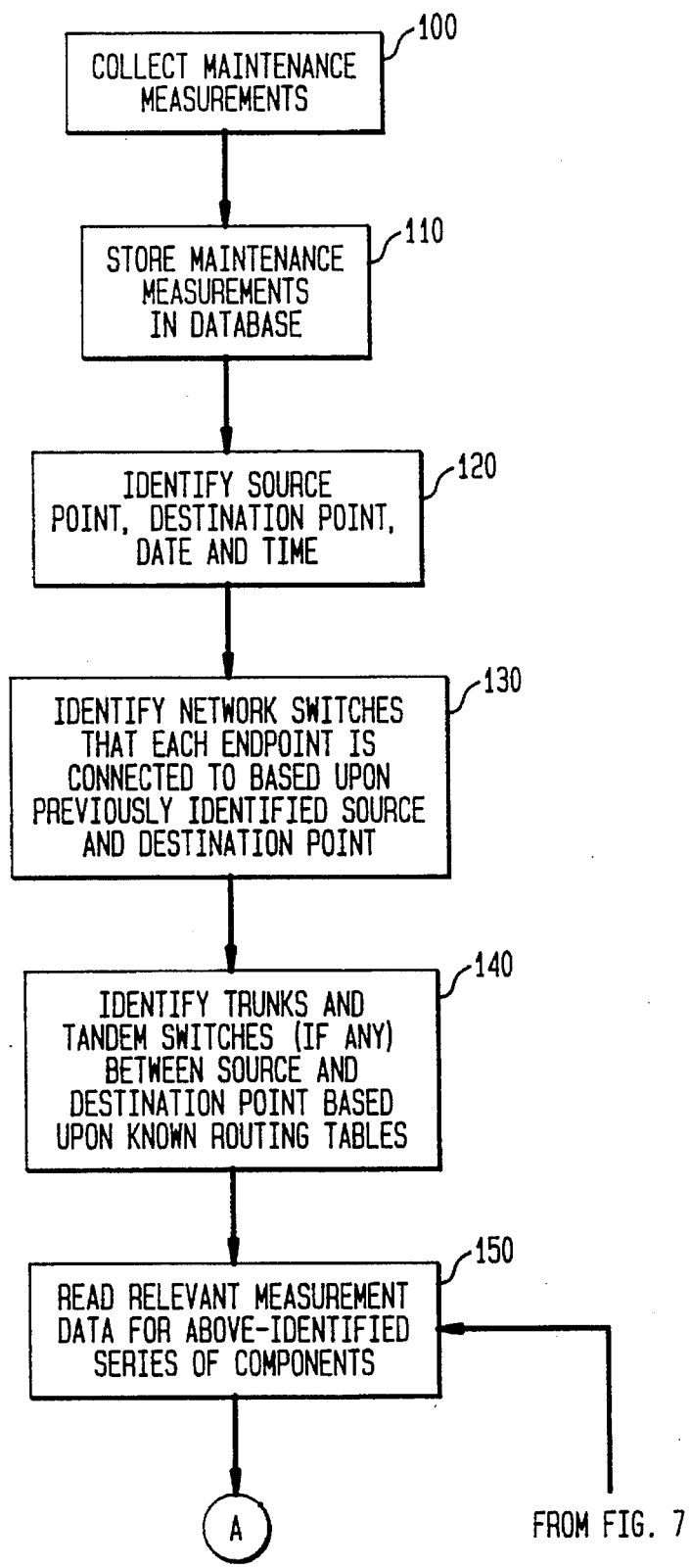
FIGS. 5–7 are block diagrams of steps performed in the preferred embodiment of the present invention.
Figure 6:
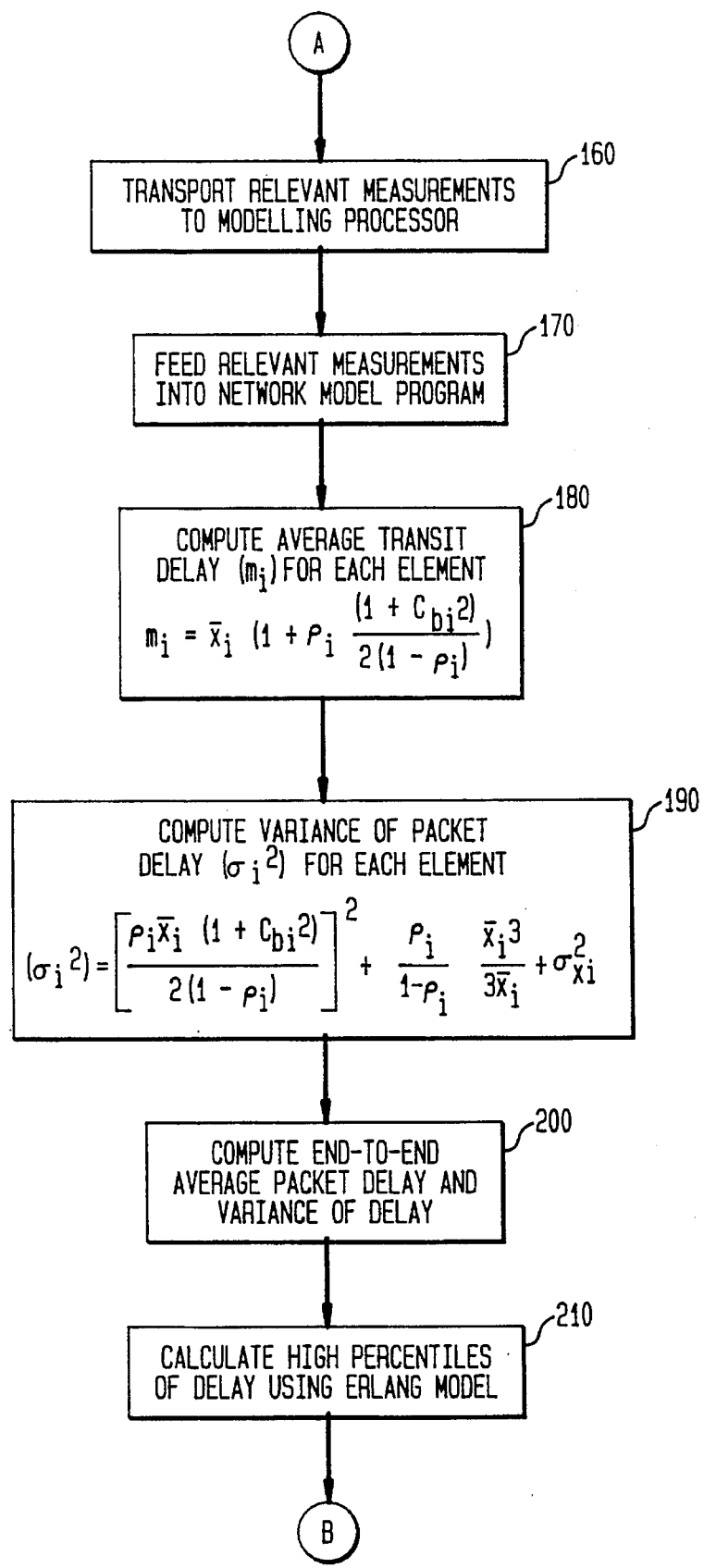
Figure 7:
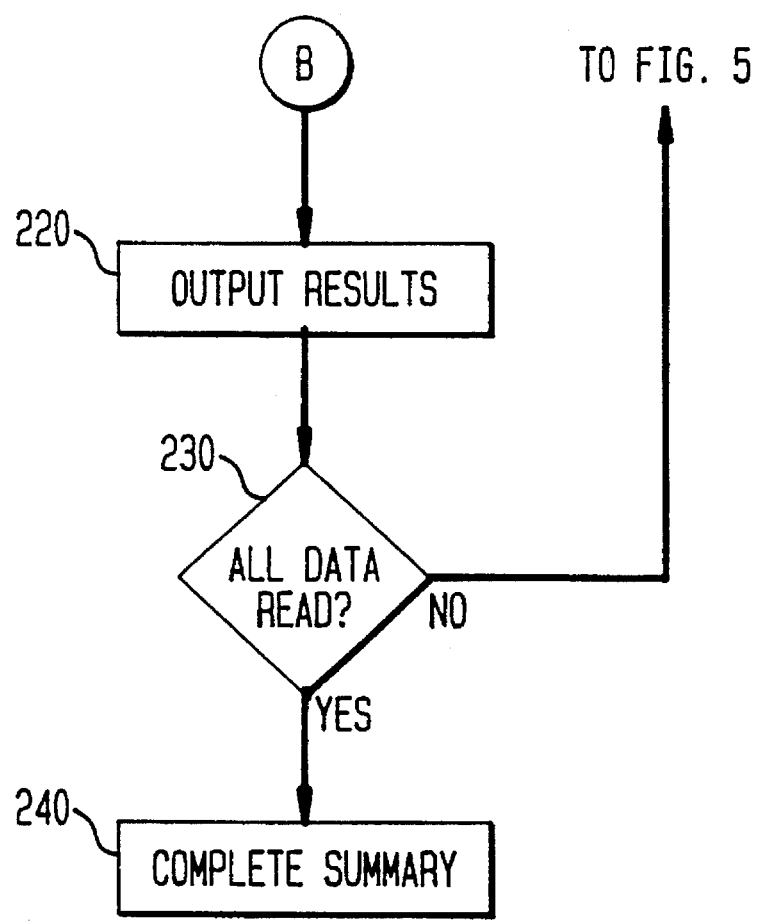

The sequence of operation of the preferred embodiment of the present invention is illustrated in FIGS. 5–7. The maintenance measurements 30 in network 10 are collected (step 100) and stored (step 110) in database 32. As previously stated, steps 100 and 110 are commonly performed in packet networks 10.

Since a typical packet network 10 may be connected to multiple source points 12 and destination points 14, it is necessary to identify a particular source point 12, destination point 14, date and time of measurement in order to determine the packet network transit delay (step 120). This identification may be accomplished by user input.

In the preferred embodiment of the present invention, however, it is preferable to randomly sample different points in the network 10. The preferred embodiment, therefore, randomly selects a desired source point 12 and destination point 14 for measuring the network transit delay therebetween, and randomly chooses the date and time of such measurement.

By randomly selecting the source and destination points 12, 14, and date and time of sampling, the present invention is capable of generating a model 40 of the network 10 and need not take actual measurements between every source and destination point 12, 14 connected to the network 10. This is desirable because, for every N end points in network 10, there exist $N^2-N$ end-to-end points. Thus, if there were 5000 end points in network 10, there would be almost 25 million paths to measure. Assuming that a customer desired hourly network transit delay measurements (also referred to as quality of service (QOS) measurements), this would amount to approximately 20 billion QOS measurements per month. Selecting random end-to-end paths based upon randomly selected source and destination points 12, 14 and taking measurements at random times dramatically decreases the number of QOS measurements necessary to generate the model 40 of the network 10.

Although the preferred embodiment of the present invention samples the packet network transit delay between randomly selected source and destination points 12, 14, it is understood that this method is utilized to make the system more practical. However, it is not a prerequisite of the present invention to randomly sample network transit delay. While it may be unpractical or inefficient, the present invention may also be utilized to actually measure transit delay based upon each source and destination point 12, 14 connected to network 10.

Once the desired source and destination points 12, 14 are identified in step 120, the system identifies the packet switches in network 10 that each end point is connected to (step 130). The network packet switches are determined based upon the particular source and destination points 12, 14 previously identified in step 120.

In step 140, the system also identifies the trunks and tandem switches (if any) between the previously identified source and destination points 12, 14. Having determined the desired source and destination points 12, 14 in step 130, the present invention utilizes known routing tables in step 140 to identify the trunks and tandem switches in the network 10 between the source and destination points 12, 14. Thus, for each desired source and destination point 12, 14, the system identifies the trunks and associated packet switches in network 10 connecting the desired source and destination points 12, 14.

Having identified the associated packet switches in network 10 that connect the desired source point 12 to the desired destination point 14, the system then reads (step 150) the relevant maintenance measurements 30 collected and stored in the network database 32 (steps 100, 110) for each identified packet switch corresponding to the identified source and destination points 12, 14, transports (step 160) the relevant maintenance measurements 30 to the modelling processor 50, and feeds (step 170) the relevant maintenance measurements 30 into the network modelling program operating in the modelling processor 50 as illustrated in FIG. 3. Methods well known in the art to transfer such data include, but are not limited to, electronic mail systems or file transfer protocol.

Figure 4:
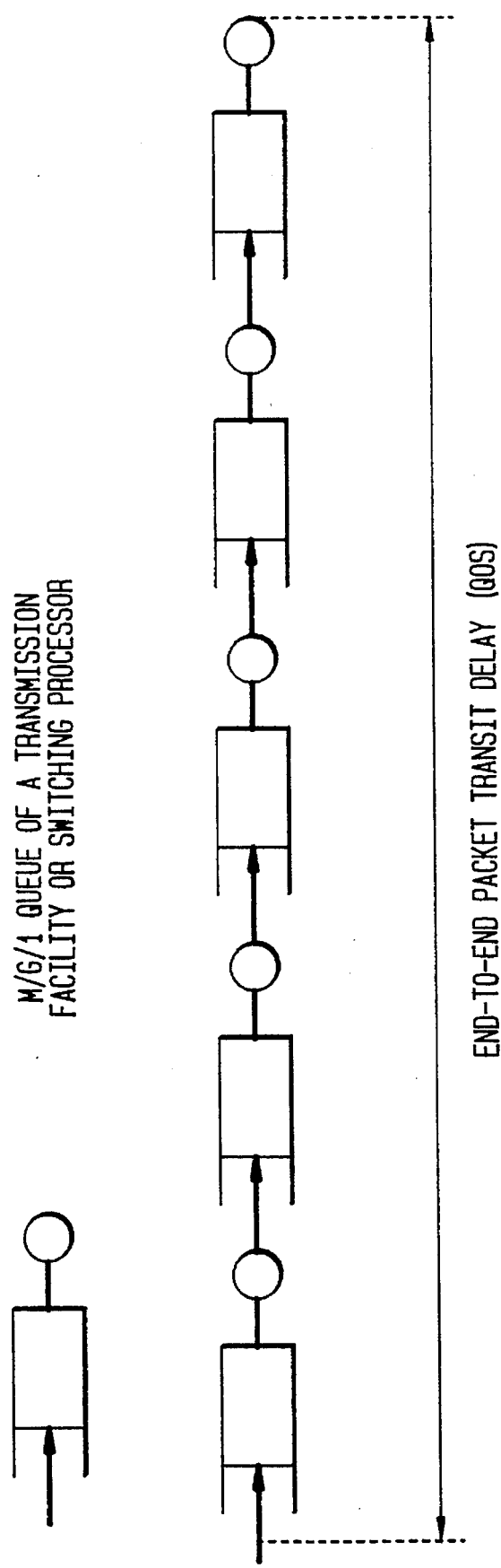
FIG. 4 illustrates the network-of-queues model utilized in the preferred embodiment of the present invention.

By utilizing the relevant maintenance measurements 30, the modelling processor 50 estimates end-to-end delay distributions for packet network 10. The system generates a model 40 of the network 10 by generating single server M/G/1 queuing models for individual network elements (e.g., identified packet switches) and constructing a network-of-queues model in a series as illustrated in FIG. 4. For analytical tractability, all queues are assumed to be independent. As will be discussed below, an Erlang probability distribution is then fit to two end-to-end delay parameters (average and variance of delay) to predict service delay performance of the network 10.

Thus, for each network element (N), the system generates a network element single server queuing model. Each element model has two primary output parameters: average transit delay ($m_i$) and variance of packet delay ($\sigma_i$). The average transit delay ($m_i$) is broken down into two components, namely, a constant (non-variable) component ($m_i^c$) and a variable component ($m_i^v$). The variable component ($m_i^v$) is derived from the randomly variable portion of the packet delay.

Referring to step 180 in FIG. 6, the average transit delay ($m_i$) for each network element (N) is calculated using the following well known formula for an M/G/1 queuing model:

$$m_i = \bar{x}_i \left( 1 + \rho_i \frac{(1+C_{bi}^2)}{2(1-\rho_i)} \right)$$

where $\bar{x}_i$ represents average service time, $\rho_i$ server utilization, $\sigma_{xi}^2$ variance of service time, and $C_{bi}^2 = \sigma_{xi}^2/(\bar{x}_i)^2$ (the coefficient of variation).

Referring now to step 190 in FIG. 6, the variance of packet delay ($\sigma_i^2$) is determined using the following well known formula for an M/G/1 queuing model:

$$\sigma_i^2 = \left[ \frac{\rho_i \bar{x}_i (1+C_{bi}^2)}{2(1-\rho_i)} \right]^2 + \frac{\rho_i}{1-\rho_i} \frac{\overline{x_i^3}}{3\bar{x}_i} + \sigma_{xi}^2$$

where $\overline{x_i^3}$ represents the third moment of service time, $\bar{x}_i$ average service time, $\rho_i$ server utilization, $\sigma_{xi}^2$ variance of service time, and $C_{bi}^2 = \sigma_{xi}^2/(\bar{x}_i)^2$ (the coefficient of variation).

Once the average transit delay ($m_i$) and variance of packet delay ($\sigma_i^2$) are determined for each network element (N) in steps 180 and 190, end-to-end performance measures for network 10 are obtained in step 200 by addition of each $m_i$ and $\sigma_i^2$ resulting in end-to-end average delays (both fixed ($m^c$) and variable ($m^v$)) and end-to-end variance of delay ($\sigma^2$) (referred to as "end-to-end packet delay statistics").

The details of step 200 are given below: Let $m_i$ and $\sigma_i^2$ denote the average and variance of delay of the ith network element (N). Let $m_i^c$ and $m_i^v$ denote the constant and variable portions of the average delay, respectively. Accordingly, the end-to-end average (m) and variance ($\sigma^2$) packet delay for the network 10 is determined as follows:

$$m = \sum_{i=1}^{N} m_i,$$

$$m^c = \sum_{i=1}^{N} m_i^c,$$

$$m^v = \sum_{i=1}^{N} m_i^v,$$

$$\sigma^2 = \sum_{i=1}^{N} \sigma_i^2.$$

Once step 200 is completed and the end-to-end average packet delay (m) and variance of delay ($\sigma^2$) are determined for network 10, a simple Erlang probability distribution is applied to the end-to-end average and variance of delay in step 210, thereby providing the high percentiles of delay (e.g., 95th percentile) frequently required by customers. Only the variable portion of the average delay ($m^v$) and the variance of delay ($\sigma^2$) are used in the Erlang distribution. The fixed portion of the average delay $m^c$ is excluded to avoid biasing the fit through effects of propagation delay and constant components of processing or insertion delays. The bias tends to make the Erlang distribution have high order, which may cause underestimation of the high percentile of delay.

The Erlang model requires two parameters, namely, average and order (r). The average is simply set to $m^v$, while the order $(r) = \min[\max[1, \lfloor (m^v/\sigma)^2 \rfloor], 10]$. The order (r) is limited to values between 1 and 10. The value of 1 corresponds to an M/M/1 queue, while the maximum value of 10 ensures that a certain minimum variability is maintained in the model 40.

The resulting Erlang distribution as a function of delay (d) is denoted $E(m^v, r, d)$. The pth percentile of delay corresponding to a given probability (p) is denoted $E^{-1}(m^v, r, p)$. The network delay performance measures are then simply estimated as follows:

Average Delay: m pth Percentile of Delay: $E^{-1}(m^v, r, p) + m^c$.

The table below shows the relationship among $E^{-1}(m^v, r, p)$, r and p for various example values of r and p. Note that for given values of r and p, $E^{-1}(m^v, r, p)$ is proportional to $m^v$.

| r | p = 0.95<br>95th % tile/$m^v$ | p = 0.90<br>90th % tile/$m^v$ |
|---|---|---|
| 1 | 3.0 | 2.4 |
| 2 | 2.4 | 1.95 |
| 3 | 2.1 | 1.8 |
| 4 | 1.95 | 1.7 |
| 5 | 1.85 | 1.60 |
| 6 | 1.8 | 1.55 |
| 7 | 1.7 | 1.55 |
| 8 | 1.65 | 1.5 |
| 9 | 1.65 | 1.45 |
| 10 | 1.60 | 1.45 |

Once the high percentiles of delay are determined in step 210, the system outputs the results as illustrated in step 220 of FIG. 7. In the event that all data has not been read (step 230), the system repeats steps 150 through 220 until all of the desired data has been processed. When all of the data has been read in step 230, the system generates a complete QOS summary report (step 240) detailing the performance of the network 10 with respect to its packet transit delay objective.

It is to be understood that the above description is only of a preferred embodiment of the present invention. Numerous other arrangements may be devised by one skilled in the art without departing from the spirit and scope of the invention. The invention is thus limited only as defined in the accompanying claims.

What is claimed is:

1. A packet network transit delay measuring system for estimating packet transit delay in an existing packet network having a plurality of packet switches, comprising the steps of:
   (a) collecting packet switch measurements;
   (b) determining element packet delay statistics based upon said collected packet switch measurements;
   (c) determining end-to-end packet delay statistics from said element packet delay statistics;
   (d) randomly selecting a source point and a destination point to sample packet transit delay therebetween;
   (e) identifying the packet switches located on a circuit between the randomly selected source and destination points; and
   wherein the element packet delay statistics are determined for each identified packet switch based upon collected measurements for that identified packet switch.

2. The packet network transit delay measuring system of claim 1, wherein said packet switch measurements comprise packet counts, byte counts, speed of circuit, errored frame rate, average packet size, packet retransmission rate, packet switch utilization and circuit utilization for each packet switch.

3. A packet network transit delay measuring system for estimating packet transit delay in a packet network having a plurality of packet switches, comprising the steps of:
   (a) collecting packet switch measurements;
   (b) determining element packet delay statistics based upon said collected packet switch measurements;
   (c) determining end-to-end packet delay statistics from said element packet delay statistics;
   (d) randomly selecting a source point and a destination point to sample packet transit delay therebetween;
   (e) identifying the packet switches located on a circuit between the randomly selected source and destination points; wherein the element packet delay statistics are determined for each identified packet switch based upon collected measurements for that identified packet switch; and
   (f) storing the collected packet switch measurements in a network database.

4. The packet network transit delay measuring system of claim 3, wherein said collected packet switch measurements are transmitted from said network database to a processor means for determining element and end-to-end packet delay statistics and end-to-end packet delay percentiles.

5. The packet network transit delay measuring system of claim 4, wherein said collected packet switch measurements are transmitted from said network database to said processor means by electronic mail.

6. The packet network transit delay measuring system of claim 4, wherein said collected packet switch measurements are transmitted from said network database to said processor means by file transfer protocol.

7. A packet network transit delay measuring system for estimating packet transit delay in a packet network having a plurality of packet switches, comprising the steps of:
   (a) collecting packet switch measurements;
   (b) determining element packet delay statistics based upon said collected packet switch measurements;
   (c) determining end-to-end packet delay statistics from said element packet delay statistics;
   (d) randomly selecting a source point and a destination point to sample packet transit delay therebetween;
   (e) identifying the packet switches located on a circuit between the randomly selected source and destination points; wherein the element packet delay statistics are determined for each identified packet switch based upon collected measurements for that identified packet switch and wherein the packet switches located on the circuit between the randomly selected source and destination points are identified using routing tables.

8. A packet network transit delay measuring system for estimating packet transit delay in a packet network having a plurality of packet switches, comprising the steps of:
   (a) collecting packet switch measurements;
   (b) determining element packet delay statistics based upon said collected packet switch measurements;
   (c) determining end-to-end packet delay statistics from said element packet delay statistics;
   (d) randomly selecting a source point and a destination point to sample packet transit delay therebetween;
   (e) identifying the packet switches located on the circuit between the randomly selected source and destination points; wherein the element packet delay statistics are determined for each identified packet switch based upon collected measurements for that identified packet switch; and
   wherein the determination of said element delay statistics for each identified packet switch comprises the steps of:
   (f) determining average packet transit delay based upon said packet switch measurements; and
   (g) determining variance of packet delay based upon said packet switch measurements.

9. The packet network transit delay measuring system of claim 8, wherein the determination of said end-to-end delay statistics comprises the step of summing the average packet transit delay and variance of packet delay for each identified packet switch.

10. The packet network transit delay measuring system of claim 9, wherein high percentiles of delay statistics are determined by applying an Erlang probability distribution to the end-to-end delay statistics.

11. The packet network transit delay measuring system of claim 10, further comprising the step of generating a summary report of the high percentiles of delay statistics.

12. A system for estimating packet transit delay in an existing packet network having a plurality of packet switches, said system comprising:
   (a) means for collecting and storing maintenance measurements for said packet switches;
   (b) processing means for determining element and end-to-end packet delay statistics based upon said collected and stored maintenance measurements; and
   (c) means for transmitting said stored maintenance measurements from said collecting and storing means to said processing means; and wherein said processing means:
   (d) randomly selects a source point and a destination point to sample packet transit delay therebetween; and
   (e) identifies the packet switches located on a circuit between the randomly selected source and destination points.

13. The packet network transit delay measuring system of claim 12, wherein said measurements comprise packet counts, byte counts, speed of circuit, errored frame rate, average packet size, packet retransmission rate, packet switch utilization and circuit utilization for each packet switch.

14. A system for estimating packet transit delay in a packet network having a plurality of packet switches, said system comprising:
   (a) means for collecting and storing maintenance measurements for said packet switches;
   (b) processing means for determining element and end-to-end packet delay statistics based upon said collected and stored packet switch measurements, wherein said processing means:
   randomly selects a source point and a destination point to sample packet transit delay therebetween;
   identifies the packet switches located on a circuit between the randomly selected source and destination points; and
   (c) means for transmitting said stored maintenance measurements from said collecting and storing means to said processing means wherein the element packet delay statistics are determined for each identified packet switch based upon collected measurements for that particular identified packet switch.

15. A system for estimating packet transit delay in a packet network having a plurality of packet switches, said system comprising:
   (a) means for collecting and storing maintenance measurements for said packet switches;
   (b) processing means for determining element and end-to-end packet delay statistics based upon said collected and stored packet switch measurements, wherein said processing means:
   randomly selects a source point and a destination point to sample packet transit delay therebetween;.
   identifies the packet switches located on a circuit between the randomly selected source and destination points; and
   (c) means for transmitting said stored maintenance measurements from said collecting and storing means to said processing means wherein the packet switches are identified using routing tables.

16. The packet network transit delay measurement system of claim 15, wherein said element delay statistics comprise:
   (a) average packet transit delay for each identified packet switch determined from the transmitted measurements for each particular identified packet switch; and
   (b) variance of packet delay for each identified packet switch determined from the transmitted measurements for each particular identified packet switch.

17. The packet network transit delay measuring system of claim 16, wherein said processor determines said end-to-end delay statistics by summing the average packet transit delay and variance of packet delay for each identified packet switch.

18. The packet network transit delay measuring system of claim 17, wherein said processor determines high percentiles of delay statistics by applying an Erlang probability distribution to the end-to-end delay statistics.

19. The packet network transit delay measuring system of claim 18, wherein said processor generates a summary report of the high percentiles of delay statistics.

* * * * *